United States Patent [19]

Seim et al.

[11] 4,398,226

[45] Aug. 9, 1983

[54] QUADRUPLEX RECORDINGS WITH FERRITE HEADS RESEMBLING QUADRUPLEX RECORDINGS WITH METAL HEADS

[75] Inventors: Roy H. Seim, San Diego; John F. Bagby, Encinitas, both of Calif.

[73] Assignee: Eastman Kodak Company, Rochester, N.Y.

[21] Appl. No.: 241,301

[22] Filed: Mar. 6, 1981

[51] Int. Cl.$^3$ .................. G11B 15/45; G11B 15/02
[52] U.S. Cl. .................................. 360/65; 360/25
[58] Field of Search ............. 360/65, 25, 31, 137

[56] References Cited

U.S. PATENT DOCUMENTS

| | | | |
|---|---|---|---|
| 3,265,818 | 8/1966 | Goossen et al. | 360/65 |
| 3,381,083 | 4/1968 | Jensen et al. | 360/65 |
| 4,017,899 | 4/1977 | Bagby . | |
| 4,038,692 | 7/1977 | Umeda et al. | 360/65 |

*Primary Examiner*—Vincent R. Canney
*Attorney, Agent, or Firm*—Robert F. Cody

[57] ABSTRACT

Prior art quadruplex head assemblies (equipped with metal heads) are detachable for purposes of refurbishment with ferrite heads. The concept of the invention is to mount corrective compensation circuits to each such refurbished quadruplex head assembly so that recordings by means of ferrite heads resemble recordings by metal heads. As a result, recordings produced by ferrite and metal heads are interchangeably playable on the same recorder without adjustment thereto. The compensation circuits are such that they self-disable during signal playback.

3 Claims, 8 Drawing Figures

QUADRUPLEX RECORDINGS WITH FERRITE HEADS RESEMBLING QUADRUPLEX RECORDINGS WITH METAL HEADS

FIELD OF THE INVENTION

This invention relates in general to quadruplex video recorders and to improvement thereto.

The invention as well as the prior art will be discussed with reference to the figures wherein.

Figure 3:
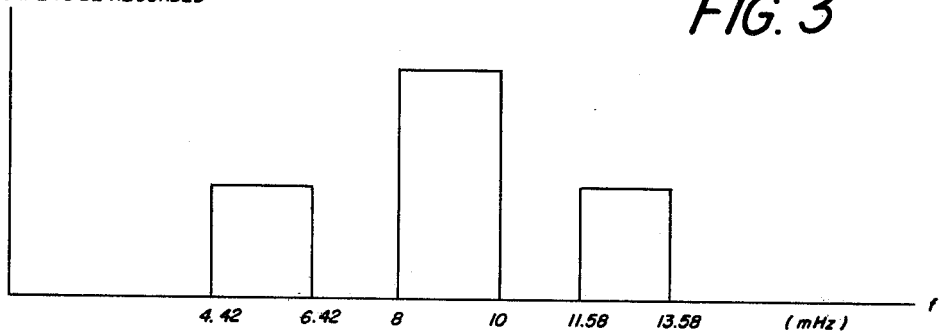
Figure 4:
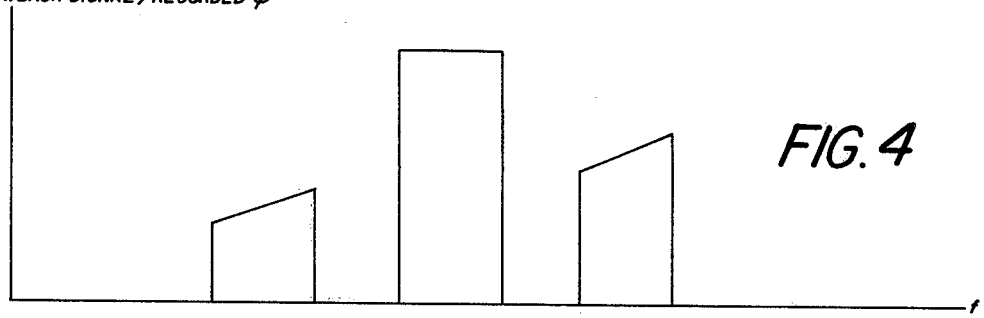
Figure 5:
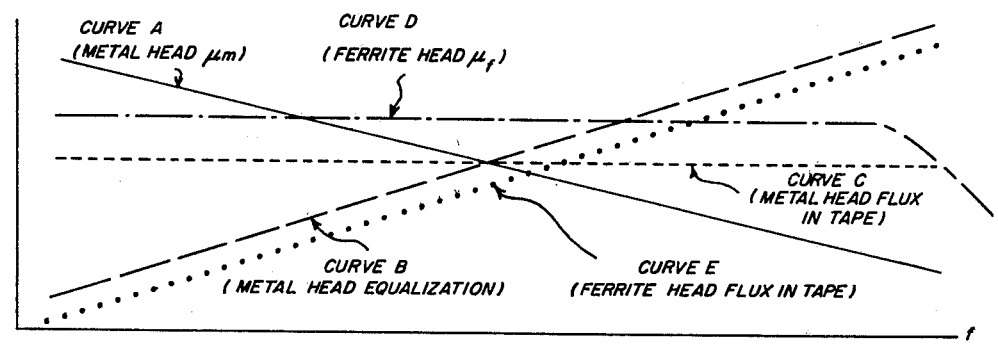
Figure 6:
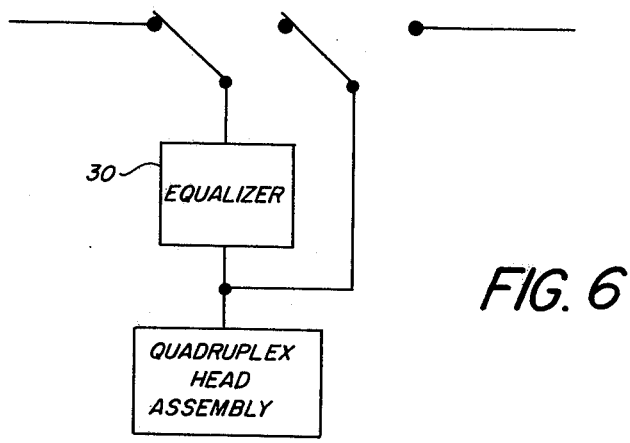
Figure 7:
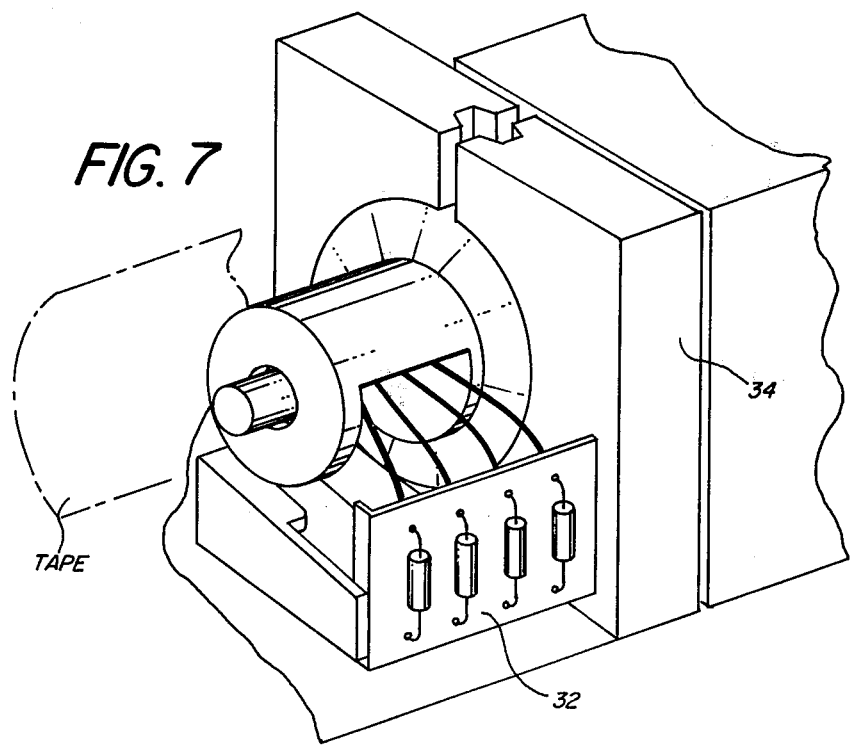
Figure 8:
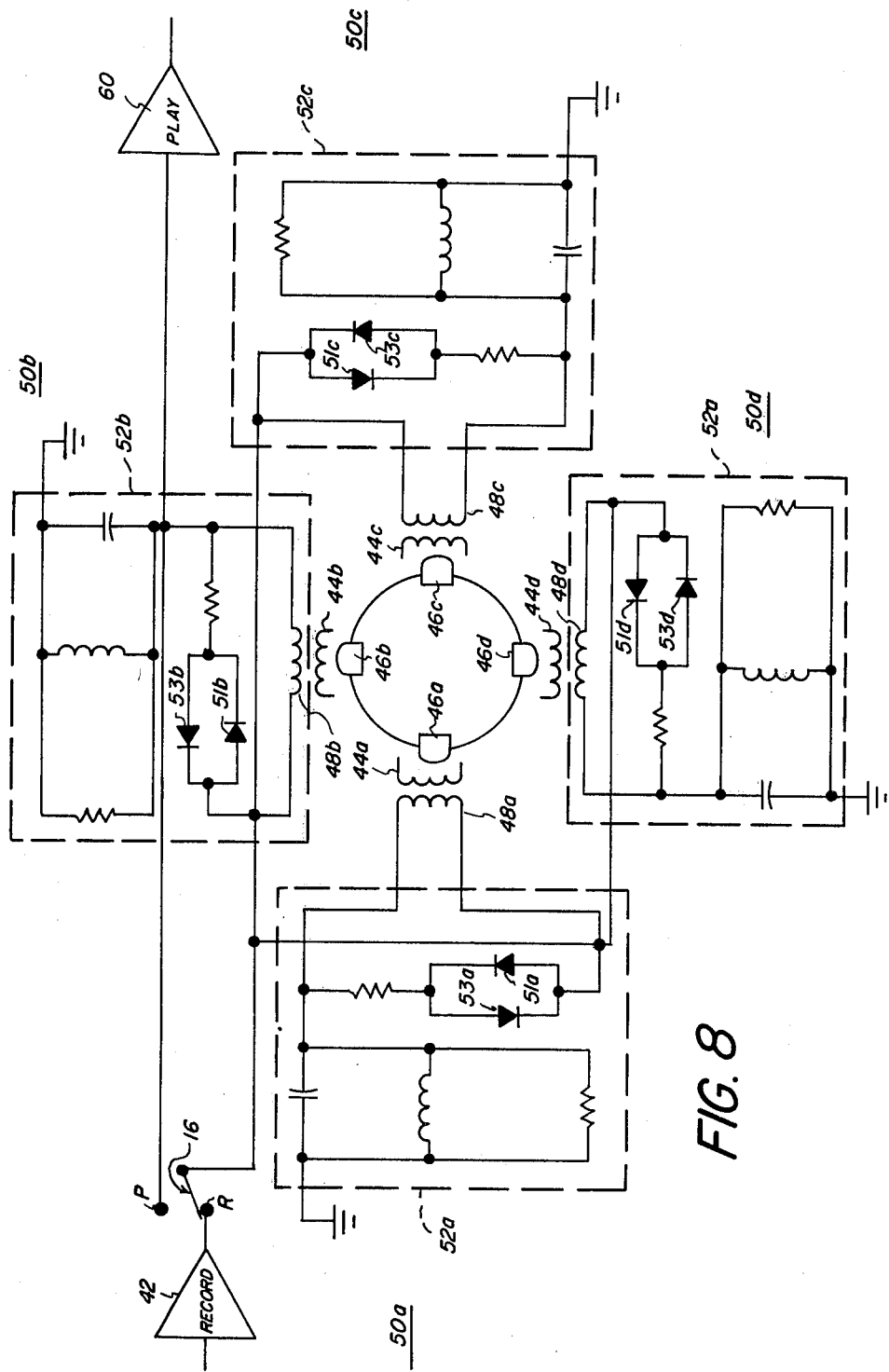

FIGS. 3, 4, and 5 are diagrams useful in describing the invention;

FIG. 6 is a block diagram illustrating a less-than-desirable solution to the problem addressed by means of the invention;

FIG. 7 is a perspective showing of a quadruplex head wheel assembly adapted to include the invention; and FIG. 8 is a schematic diagram illustrating apparatus according to the invention.

DESCRIPTION RELATIVE TO THE PRIOR ART

The standard video recorder of the television broadcast industry is the quadruplex video recorder developed by Ampex Corporation. The quadruplex recorder, aside from various record and reproduce electronics, and controls, employs a scanning head wheel which coacts with recording tape to record and reproduce video signals. The scanning head wheel rotates crosswise of the tape and supports four single track video record/reproduce heads which abradingly sweep across the tape at high speed. Because of such abrading contact, the heads of quadruplex recorders tend to wear out relatively quickly. Indeed, the life expectancy of what has been the typical quadruplex head has been about 250 hours of use. The typical prior art quadruplex head is made of magnetic metal.

Although there are certainly some differences in the parameters (e.g. permeability, resistivity, etc.) of different metal quadruplex heads, such differences are not all that great; and heads from one supplier can, relatively easily, be substituted for the heads of another without causing significantly discernible changes in the video displays resulting from use of quadruplex recorders.

Relatively recently, an advance in the design of video heads useful in quadruplex recorders was perfected (see U.S. Pat. No. 4,017,899, assigned to the assignee hereof), whereby the life expectancy of quadruplex heads leaped about four-fold to around 1,000 hours of use. The newly designed heads are comprised of extremely hard (but brittle) long-wearing ferrite material. Because of their intrinsic brittleness, however, the new heads are provided with cladding to protect their side edges from crumbling in the vicinity of their gaps.

Despite the great advance in life expectancy provided by the new ferrite heads, though, the adaptation of existing quadruplex recorders by the broadcast industry to include such heads has been brought with a rather severe problem: With the equalization of a quadruplex recorder adjusted to accommodate the new ferrite heads, it happens that tapes, pre-recorded by use of metal heads, are productive during video playback of color over-saturation. It would, of course, be possible to adjust (or readjust as the case may be) a quadruplex recorder depending on whether it was reproducing signals recorded by means of metal heads or by means of the new ferrite heads. But such a tack is not too practical when, for example, tapes produced by means of metal heads are interspersedly spliced to tapes produced by means of ferrite heads. Consider, for example, that a pre-recorded commercial made by use of a quadruplex recorder having metal heads is to be spliced into a taped TV program made by means of a recorder having ferrite heads. In such a case, either the playback electronics will have to be optimized for good playback (and thus broadcasting) of either, but not both, the commercial or the program.

Certainly, it is within the realm of possibility to convert "metal-produced" tape into "ferrite-produced" tape, whereby the problem of differing playback depending on how a given tape was prepared would vanish (i.e. all pre-recorded tapes would be recorded by means of ferrite heads), but such a conversion would be both time consuming and costly.

The broadcast industry standards within the United States are such that tapes produced on the various quadruplex machines are interchangeable. Thus, a tape produced by means of an Ampex Mark XV quadruplex recorder is playable on an RCA quadruplex recorder, and vice versa. With this caveat in mind, then, consider the simplified block diagram of FIG. 1 which is applicable to either the RCA or Ampex quadruplex recorders: A baseband video signal, after appropriate processing, is applied to a frequency modulator 10 which converts the baseband signal to its FM equivalent: "peak white" corresponding to a carrier frequency of 10 MHz; "black" corresponding to a carrier frequency of 8 MHz; and the center frequency corresponding to 9 MHz. (There are, as is known, 100 IRE units between "black" and "peak white".) As is the practice, the form of frequency modulation is narrow band FM wherein the modulation index is less than one, and wherein there are few FM sidebands, and these correspond, largely, to those which occur when employing amplitude modulation. This is an important point to appreciate since it bears on an understanding of the problem solved by means of the invention, as will be discussed below.

After appropriate signal processing, by electronics 12, and equalization (14), the modulated signal is applied via a record/play switch 16 to a quadruplex head assembly 18 for recording in tape (not shown). The assembly 18—which is detachable from the recorder of FIG. 1—comprises the above-mentioned head wheel and associated motors. During playback, the switch 16 is appropriately set so that signals derived from the tape by means of the quadruplex head assembly 18 may be applied to processing electronics 20 via an equalization circuit 22, the latter serving to compensate for $d\phi/dt$ dependence of the playback signal.

Figure 1:
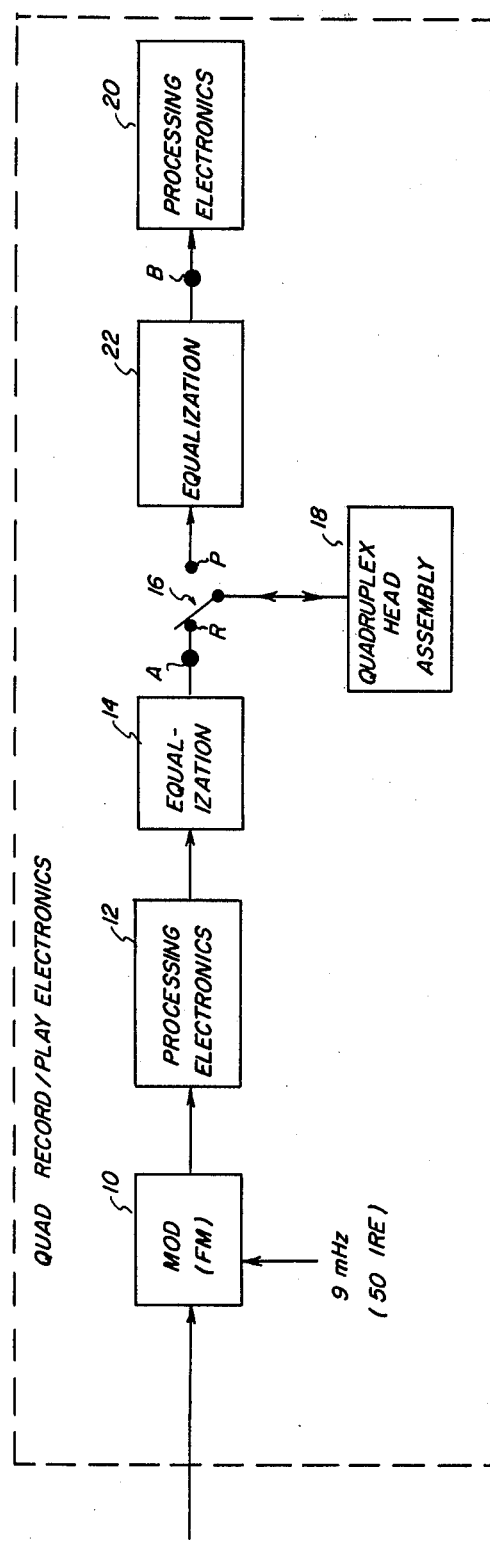
FIG. 1 is a schematic block diagram of part of a quadruplex recorder.
Figure 2:
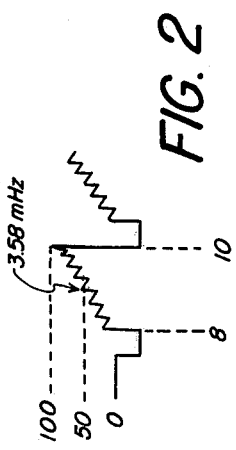
FIG. 2 illustrates a test signal for determining the source of a problem solved by means of the invention.

In an effort to identify the cause of the saturated chroma problem, a test signal as depicted in FIG. 2 was applied to the quadruplex recorder of FIG. 1 adapted to include the new ferrite heads, but provided with the playback equalization necessary to the use of metal heads. The narrow band FM record signal which appeared at point A of FIG. 1 was then spectrum analyzed (FIG. 3). Some comments: With the luminance carrier sweeping between 8 and 10 MHz, the color subcarrier of 3.58 MHz frequency modulates the luminance carrier to produce a pair of chroma sidebands between 4.42 MHz and 6.42 MHz, and between 11.58 MHz and 13.58 MHz. Because of the above-mentioned narrow band frequency modulation which is employed, the spectrum of FIG. 3 resembles that of an amplitude modulation.

Having saturation recorded the luminance carrier part of the signal which appears at A of FIG. 1, the playback signal at point B of FIG. 1 was spectrum analyzed (FIG. 4). Some comments: The luminance carrier provides bias for the direct recording of the chroma sidebands; but there is significant gain variation, as a function of frequency, between the played back upper and lower sidebands. (No gain variation as a function of frequency is evident with respect to the luminance carrier because such carrier is saturation recorded.) Since "frequency" correlates with the amplitude of the luminance signal and "sideband amplitude" correlates with the amplitude of the color subcarrier, there is complete corroboration of the discussion of *Transmission Systems for Communications*, Bell Telephone Laboratories, Inc., 1964, page 370, as pertaining to the matter of color saturation:

Distortion of color saturation will occur if the gain of the transmission system at the color carrier frequency is a function of the amplitude of the luminance signal. This variation in the amplitude transmission of the color signal caused by variation in the amplitude of the luminance signal is called differential gain. The presence of differential gain in a system used to transmit color television may result in a picture in which some colors may appear dim or washed out while others may appear oversaturated.

Knowing the source of the color variation, an explanation for its cause was then sought. See FIG. 5: Given that the permeability $\mu_M$ of metal heads decreases as a function of frequency (Curve A), it is customary to equalize (Curve B) the recording process so that the amplitude of the signal flux recorded in the tape is flat with frequency (Curve C). It will be appreciated that the permeability $\mu_F$ of the ferrite used in the new ferrite heads is flat with frequency (Curve D) in the frequency range of interest; and so, when the equalization employed for metal heads "sees" the flat frequency response of the new ferrite heads, it provides high frequency boost (Curve E) to the signal which gets recorded in the tape. That is, whereas metal heads (with certain equalization) effect flat flux versus frequency in the tape, ferrite heads (with that same equalization) effect a rising flux versus frequency relationship in the tape. This accounts for the differential gain, and chroma problem, associated with the upper and lower sidebands of FIG. 4.

To eliminate the differential sideband gain, and chroma problem, it would certainly be within the realm of possibility to provide high frequency attenuation (or low frequency boost) to the signal to be recorded by ferrite heads, whereby the tape flux versus frequency relationship would become flat. (In other words, all recordings—whether by metal or ferrite heads—would be alike, at least with respect to the flux versus frequency relationship.) To do so, however, would—in the typical situation—require some modification to the quadruplex recorder panel. That is, to rig a quadruplex recorder having ferrite heads to include a correction equalizer 30 as depicted in FIG. 6 would require, undesirably, some modification to the recorder. The circuit 30 would, of course, have to be "connected-in" during recording; and since the playback signal is (save for the $d\phi/dt$ effects) flat with frequency to begin with, and of a low level, the circuit 30 would have to be cut out during playback.

SUMMARY OF THE INVENTION

With the above as background—and since the quadruplex head assembly, per se, is detachable for purposes of refurbishment thereof—the concept of the invention is to mount corrective attenuation circuit(s) directly to the quadruplex head assembly, such circuits being of a type which self-disable during signal playback. Thus, no alteration ever need be made to the quadruplex recorder to effect a uniform standard for the level of recorded flux, regardless of the nature of the head employed. Head assemblies employing metal heads will record a certain way . . . and head assemblies equipped with ferrite heads (plus the corrective attenuation circuit) will record that very same way. During playback, however, the improved efficiency of ferrite heads vis-a-vis metal heads is brought to bear as the corrective circuits cut out. There is, pursuant to the invention, virtually no difference between recordings made by quadruplex head assemblies equipped with metal heads or with ferrite heads, so long as the corrective circuits are employed. As far as the user is concerned, and except for the long life provided by ferrite heads, he could not care less whether his recordings were by metal or ferrite heads since all such recordings are all essentially identical, and playback is the same.

DETAILED DESCRIPTION OF THE INVENTION

In accordance with the invention, a quadruplex head wheel assembly, such as the Ampex Mark XV unit of FIG. 7, is equipped with ferrite record/reproduce heads and a corrective circuit 32 which causes the head assembly to resemble, operationally, a head wheel assembly equipped with prior art metal heads. As indicated, the circuit 32 is mounted at any convenient location on the assembly which, in the case of the Mark XV unit, is adjacent to the female guide 34 of the unit. When a quadruplex head assembly (regardless of design) that is equipped with prior art metal heads is received for refurbishment with long-lasting ferrite heads, the old heads are removed; new ferrite heads are installed; and a corrective circuit mounted in place. The modified unit is then returned to the customer for installation in his quadruplex recorder (without any modification to the recorder). As far as the customer is concerned, the refurbishment unit records (virtually) no differently from the one equipped with metal heads . . . but the life expectancy of the refurbishment is about four times greater (and playback is better).

FIG. 8 shows schematically the circuit configuration of apparatus according to the invention: Video signals to be recorded are applied from a record amplifier 42, via the record/play switch 16, to coils 44a,b,c,d associated with ferrite heads 46a,b,c,d respectively. Coupling to the head coils 44 is by means of a rotary transformer symbolically identified as four separate coils 48a,b,c,d respectively. The depicted coils 48, depending on whether the FIG. 8 circuit is recording or reproducing signals, act as either primary or secondary transformer windings.

Each head 46a,b,c,d has associated with it a corresponding correction circuit 50a,b,c,d, each of which (taken with respect to coils 48a,b,c,d) is comprised of a series component and a parallel component. A resistor, capacitor and inductor make up the series component; and a resistor and two diodes make up the parallel component. The compensation which is afforded the signal to be recorded is such that the ferrite heads, when taken together with the compensation networks, provides response curves like Curve A of FIG. 5 (and not like Curve D thereof). Taking, by way of example, the circuit 50a, assume that a video signal is to be recorded by the head 46a. Such signal is applied in parallel to the rotary transformer "primary" 48a and to the corrective circuit 50a. Since the record signal is large, the diodes 51a, 53a (depending on the instantaneous polarity of the signal to be recorded) are biased into conduction, thereby enabling current from the parallel component to flow through the series component to effect the desired compensation. In a like manner, the networks 52b,c,d cooperate with the heads 46b,c,d to cause their respective network-and-head combinations to have response curves, during recording, like Curve A of FIG. 5. Thus, the desired effect of having recordings which are indistinguishable as having been made by either ferrite or metal heads is achieved.

As to the matter of playback, two things must be noted: (1) since the playback signal is relatively weak to start with, it should not be attenuated; and (2) since, according to the invention, recordings whether by metal or ferrite heads will always look like metal head recordings, playback equalization to accommodate the high efficiency frequency heads may be set, and left alone, without regard to the origin of any tape, or splice thereof. With the above as background, it then becomes incumbent that the compensation networks self-disable during playback, this being accomplished because the nominal thresholds of the diodes 51 and 53 are never exceeded by the playback signal. During playback, therefore, the full playback signal is developed across the rotary transformer "coils" which, in this instance, act as transformer secondaries. The playback signal is then applied via the switch 16 to a playback amplifier 60, whence it is equalized to obtain the full advantage of high efficiency playback with the ferrite heads 46a,b,c,d.

The invention has been described in detail with particular reference to preferred embodiments thereof, but it will be understood that variations and modifications can be effected within the spirit and scope of the invention.

What is claimed is:

1. A quadruplex head wheel assembly for recording and playing back video signals comprising
    (a) a rotary head wheel,
    (b) ferrite magnetic heads supported by said head wheel and having respective coils inductively coupled thereto, and
    (c) compensation circuit means mounted directly upon said head wheel assembly and including (1) means for modifying record signals applied to said coils so that said signals, when recorded in a magnetic medium, are of a form similar to signals recorded by means of metal heads and (2) means for effectively disabling said compensation circuit means while playback signals are applied to said coils, whereby said quadruplex head wheel assembly may be employed to produce tape recordings playable by means of a quadruplex recorder employing metal heads without significantly having to adjust the performance of said recorder, said compensation circuit means being comprised of respective compensation circuits for each head supported by said head wheel, and said respective compensation circuits being comprised of first and second parts, the first part being a frequency responsive circuit and the second part being a threshold circuit cooperative with said first part for effectively disabling said compensation circuit during the playback of recorded signals.

2. The apparatus of claim 1 wherein said first part of each compensation circuit is a tuned circuit connected in series with its respective head coil, and wherein said second part of each compensation circuit is a threshold circuit connected across that head coil.

3. The apparatus of claim 2 wherein each said threshold circuit is comprised of oppositely biased diodes electrically connected in parallel and having predetermined nominal thresholds, whereby for relatively large record signals, in response to which said diodes conduct, the threshold and tuned circuits coact to provide predetermined compensation, but for relatively small playback signals, for which said diodes do not conduct, only said tuned circuits process said playback signals without significant modification.

* * * * *